Feb. 18, 1964  D. B. BROUGHTON  3,121,625
ADSORPTIVE SEPARATION OF GAS MIXTURES
Filed Oct. 5, 1960
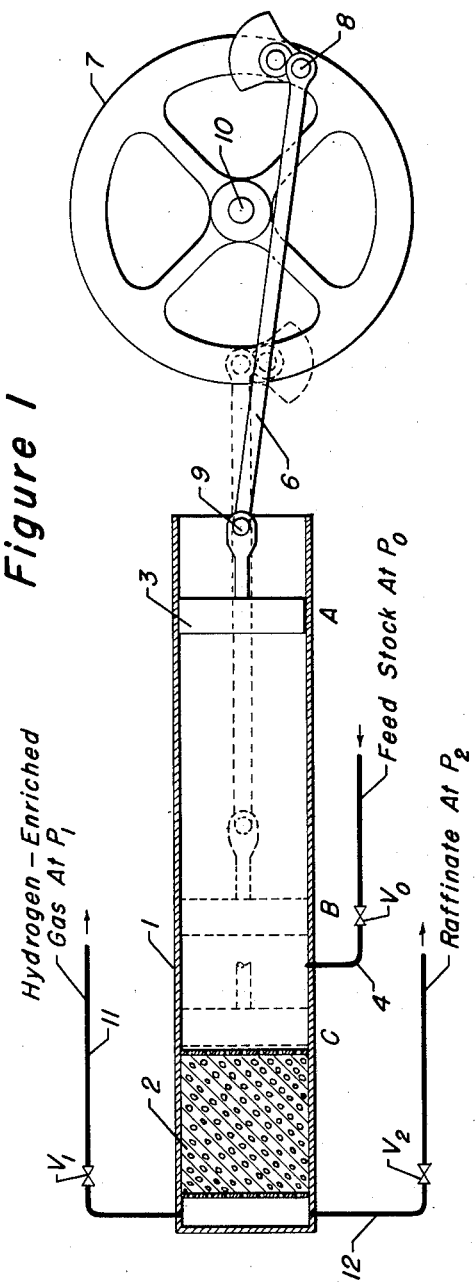
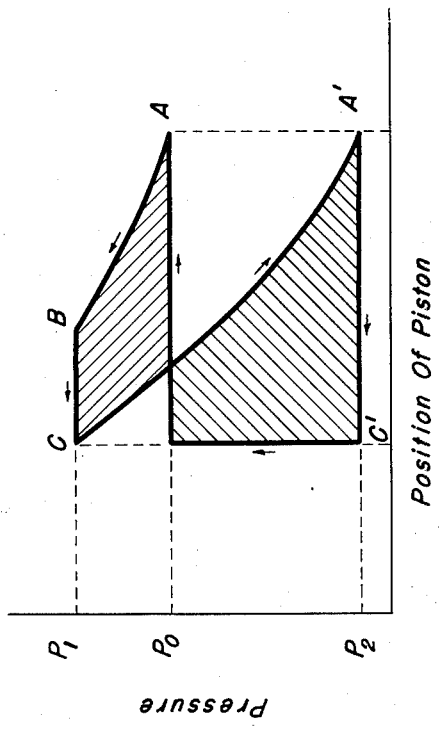
INVENTOR:
Donald B. Broughton
BY: Chester J. Giuliani
Donald E. Moehling
ATTORNEYS 3,121,625
ADSORPTIVE SEPARATION OF GAS MIXTURES
Donald B. Broughton, Chicago, Ill., assignor to Universal Oil Products Company, Des Plaines, Ill., a corporation of Delaware
Filed Oct. 5, 1960, Ser. No. 60,670
3 Claims. (Cl. 55—58)

This invention relates to a process for separating hydrogen-containing gas mixtures into product gas stream substantially enriched with respect to hydrogen and a stream comprising one or more other components of the mixture which are subject to sorption under pressure on a solid sorbent. More specifically, this invention concerns the production of a hydrogen-enriched concentrate from admixture thereof with a normally non-condensable gas by contacting the gaseous feed mixture at sorption conditions with a sorbent at an elevated pressure, withdrawing at said elevated pressure the hydrogen-enriched concentrate from the sorbent as a nonsorbed raffinate, thereafter releasing the sorbed component from the sorbent at a reduced pressure, and after removal of a substantial proportion of the sorbed component from the sorbent, repeating the foregoing sorption-desorption cycle. The present invention also relates to a suitable arrangement of apparatus for effecting the foregoing separation whereby the energy consumed in compression of the feed gas mixture is recovered from the energy released by expansion of the gas mixture from the elevated pressure to the reduced pressure.

A large number of chemical processes are presently in use in which hydrogen is consumed as a reactant and wherein the effectiveness of the reaction, such as the yield and desired end product, is dependent in large measure upon the concentration of hydrogen present in the gas phase during the course of the reaction and in contact with the reactants undergoing conversion. In most instances, the conversion results in the formation of an incidental by-product of the process consisting of a gas which has a low boiling point and which has been heretofore recovered from the hydrogen-containing effluent of the process only by distillation techniques, by adsorption or by other costly procedures which makes the recovery of the hydrogen reactant from the effluent of the process a costly alternative. The cost of recovering the hydrogen from the gaseous effluent of the conversion process, being uneconomical, the effluent is generally withdrawn from the process cycle as waste gas. Thus, for example, in the petroleum refining industry, hydrogen is utilized in many processes wherein the conversion is effected in the presence of a catalyst and the hydrogen supplied to the reaction zone is required at a relatively high concentration. The effluent gaseous product is generally contaminated with a significant proportion of light hydrocarbon gases such as methane, which is not readily separable from hydrogen except by means of costly distillation techniques. For example, in the catalytic reforming of petroleum fractions boiling in the gas oil range to form aromatic or gasoline boiling range fractions in the presence of hydrogen of at least 75 and more preferably, of at least 85 percent concentration, the effluent gas stream from such a reforming process, after separating the more readily condensable components by cooling the effluent gas under pressure, very often and usually contains not more than about 60 percent by weight of hydrogen in admixture with methane, a gas mixture wholly unsuitable for recycle to the reforming reaction zone as a source of the hydrogen. Accordingly, the hydrogen recycle stream separated as a gaseous effluent of the reforming process is generally vented and/or burned because the cost of increasing the proportion of hydrogen in the light gaseous effluent, for example, by fractionation, is not an economical expedient. The present process provides a means of economically recovering hydrogen from relatively lean hydrogen gas-containing mixtures to form a gas product substantially enriched with respect to the hydrogen component and useful in many processes in which the required concentration of hydrogen is at least 85 to 100 percent. The present process is also marked by economy of operation since much of the energy required to compress the gas feed stock to the present process during the sorptive separation stage is recovered in the form of work energy required to drive a secondary compressor which compresses the feed stock at the same time that the compressed gas is expanded.

One object of this invention is to provide a method for concentrating the hydrogen component in a hydrogen-containing gas stream, particularly for recycle purposes in a process employing hydrogen as one of the reactant components. Another object of this invention is to provide an effective means for recovering hydrogen in high concentration wherein compression of the feed mixture to high pressures and liquefaction of the mixture by costly refrigeration is eliminated and replaced by a process which is marked by economy of operation and the use of simple equipment. Still another object of this invention is to adapt a hydrogen concentration process to deliver a hydrogen concentrate of 90 percent or greater purity at a pressure utilized in the conversion process employing said hydrogen.

In accordance with one of its embodiments this invention relates to a process for separating hydrogen from a mixture of gases containing hydrogen and a gaseous component which is sorbed on a solid sorbent with greater retentivity at an elevated pressure than at atmospheric pressure which comprises contacting said mixture at said elevated pressure with a sorbent selected from the group consisting of activated carbon, activated alumina and a metal alumino-silicate molecular sieve sorbent, withdrawing the non-sorbed hydrogen from said sorbent at substantially said elevated pressure and thereafter, withdrawing sorbed component from the sorbent at a pressure substantially less than said elevated pressure.

The present system of separation may be applied to any hydrogen-containing gas mixture in which at least one other component of the mixture is a normally gaseous compound or fraction capable of being sorbed on particles of a solid sorbent. Typical of such gas mixtures utilizable in the present process as feed stocks are the light non-condensable gases recovered as overhead from the high pressure product fractionators of hydrocarbon conversion processes operated in most refineries, and containing, for example, such gases as methane, ethane, ethylene, hydrogen sulfide, ammonia, or other gaseous material which is difficult to separate from the hydrogen mixture by fractional distillation means because of the low boiling points of the gaseous components. Nitrogen is more readily sorbed on certain types of sorbents, such as the metal alumino-silicate molecular sieves, than hydrogen and accordingly mixtures of nitrogen and hydrogen, such as the effluent of an ammonia conversion process, may be separated in the present method of separation utilizing a metal alumino-silicate molecular sieve sorbent at selective sorption conditions of temperature and pressure. Another application of the present method of separation which is a typical adaptation of the process is the recovery of hydrogen from carbon monoxide or carbon dioxide and nitrogen, produced, for example, in a typical water gas reaction. Hydrogen may also be separated from such gases as carbon dioxide, argon, krypton and other inert gases, as produced in a variety of processes of synthetic or natural origin.

Solid sorbents utilizable in the process of this invention are selected from a group of especially preferred activated sorbents, including activated carbon and activated alumina and particularly the metal alumino-silicate molecular sieve type solid sorbents, which when dehydrated and especially activated, contain pores having sizes of from 4 to about 10 Angstrom units in cross-sectional diameter. The pores present in the crystals of alumino-silicate molecular sieve type solid sorbents are thus of molecular dimensions and furthermore, are of substantially uniform size in a given molecular sieve sorbent. These metal alumino-silicate sorbents exist naturally in certain forms of zeolites and they may also be prepared synthetically by processes involving the selective crystallization of the alumino-silicates from aqueous suspensions of alumina in silica sols and water. The synthetic forms of metal alumino-silicates are available as articles of commerce in several different modified forms, such as Linde type 4A, type 5A, type 13X and others. Of the naturally-occurring zeolites, which when dehydrated form molecular sieve sorbents useful in the present process, particularly effective are such zeolites as chabazite, analcite, phacolite, gmelinite, harmotone, and other metal-base exchange modifications of these naturally-occurring zeolites. Of the metal alumino-silicate sorbents, dehydrated to develop their porous structure, the preferred species are the Linde Products Co. 4A and 5A (sodium and calcium, respectively), alumino-silicates which are available as articles of commerce.

The particular solid sorbent or adsorbent used for any specific feed stock is selected on the basis of the physical and chemical properties of the feed stock and the character of the separation to be effected. Thus, in the separation of a mixture of hydrogen and methane, obtained for example, as the gaseous effluent of a hydrocarbon conversion process, the gas mixture is most effectively separated to produce a hydrogen concentrate by contacting the mixture of gases with a molecular sieve sorbent of the type consisting of dehydrated crystals of calcium alumino-silicate, hereinabove described, which when contacted at an elevated pressure with the feed stock, sorbs and retains within its porous structure the methane component and permits the hydrogen to be withdrawn at the elevated pressure without being retained by the sorbent. The term "sorbent" herein is intended to be a general designation of porous particulate solids having sorptive properties, including adsorbents which retain the sorbate by surface forces and molecular sieve sorbents which retain the sorbate by occlusion within the pores of the sorbent.

The adsorptive separation process comprising the present invention is carried out at any suitable temperature and pressure at which the hydrogen-containing gas mixture utilized as feed stock is maintained in its gaseous state. The adsorption stage of the process is preferably effected at temperatures of from about 0° to about 300° C. and more preferably at temperatures of from about 20° to about 100° C. and at pressures up to 10,000 pounds per square inch, although substantially lower pressures are also operable in most instances, being generally determined by the pressure at which the hydrogen is utilized in the conversion process. Thus, in the conversion of gas oils in the catalytic reforming process, in which the hydrogen is supplied to the process at a pressure within the range of from about 800 to about 1000 p.s.i.g., the effluent hydrogen stream may be supplied directly into the present separation process at the reforming process pressure, if desired.

The present invention is further described by reference to the accompanying diagram, FIGURE 1 of which illustrates a figurative embodiment of the principles applicable in the process of separation provided herein. FIGURE 2 of the diagram represents the relationship between the pressure variable existing within the system employing the present process and the position of the piston figuratively illustrated in FIGURE 1, above.

Referring to FIGURE 1 of the accompanying diagram, an apparatus is illustrated which would constitute an operable embodiment of this invention and which illustrates the principles upon which the present separation process is based, although a variety of other suitable arrangements of apparatus may also be utilized in the process to effect the desired separation of components present in the feed stock mixture. The apparatus illustrated in FIGURE 1 consists in general, of a pump containing a bed of the desired adsorbent in the cylinder of the pump and a piston coupled with a suitable source of power for compressing the feed gas admitted to the cylinder, together with valves for properly admitting and releasing the gas streams from the cylinder of the pump. The essential functional elements of a suitable form of pump and sorbent bed as illustrated in FIGURE 1 comprise a cylinder 1 containing an adsorbent bed 2 at the forward or high pressure end of the cylinder. The bed of adsorbent is a loosely packed bed of particles of a sorbent capable of sorptively retaining the non-hydrogen components of the feed stock at an elevated pressure. A piston 3 which is sealed against the internal walls of the cylinder moves reciprocally within the cylinder to alternately compress and decompress the gases admitted to the cylinder through line 4 in amounts controlled by valve $V_0$. The feed gas charged into the process through line 4 is supplied at a pressure $P_0$, which is preferably at a level somewhat above atmospheric and in any event, at a level above the desorption pressure, hereinafter described. In order to maintain the operation of the piston on a continuously reciprocating basis and in accordance with well-established pump design principles, the piston is connected by means of connecting rod 6 to fly-wheel 7, pinioned at one end to the fly-wheel at 8 and pinioned at the other end to the piston at 9. Power is transmitted to the fly-wheel through axle 10 from an auxiliary source of power, such as an electric motor, not illustrated. A discharge line 11 containing valve $V_1$, at the compression or high pressure end of the cylinder and connected to an outlet port beyond sorbent bed 2 is provided for delivery of the non-sorbed, hydrogen-enriched gas from the sorbent at pressure $P_1$. A second discharge line 12 containing valve $V_2$ at the compression or high pressure end of the cylinder and connected to a second outlet port beyond the bed of sorbent delivers the sorbable component of the feed gas mixture from the process at pressure $P_2$ when the pressure on the sorbent is released. The pressure $P_0$ at which the feed stock enters the separation process is desirably at least somewhat above atmospheric, although from the standpoint of actual operation of the process, it is necessary only that $P_0$ be less than $P_1$ and greater than $P_2$.

The process of this invention and the relationship between the pressures existing within the sorbent bed at various stages of the process corresponding to certain positions of the piston in the cylinder, figuratively illustrated in FIGURE 1, above, is further illustrated in FIGURE 2. The beginning of the cycle of operation is arbitrarily taken as position A in FIGURE 2 at which the cylinder is filled with feed gas mixture containing hydrogen at a certain pressure $P_0$ which may be atmospheric or more preferably, superatmospheric, as for example, at a pressure somewhat less than the pressure at which the conversion process utilizing the hydrogen product and associated with the present separation method is operated. All valves are thereafter closed, including the gaseous feed stock inlet valve $V_0$ and the flywheel pushes the piston from position A at pressure $P_0$ to position B, thereby compressing the gas mixture on the high pressure side of the piston and in the sorbent bed to $P_1$. The corresponding position of the piston on the diagram shown in FIGURE 2 is at B on the diagram. Depending upon the mixture of gases utilized as feed stock, that is, the identity of the sorbable component in the feed stock mixture, the proportion of the gas mixture comprising hydrogen, the identity of the particular sorbent utilized in sorbent bed 2 and other factors involved in the process, pressure $P_1$ may be at a level only slightly superatmospheric to pressure levels up to about 10,000 pounds per square inch gauge, or even higher, if required for the process. In general, the ratio of sorbed to non-sorbed material in the bed of sorbent, and hence, the purity of the hydrogen product, increases in direct proportion to the pressure.

With the position of the piston in the cylinder at B, valve $V_1$ in line 11 is thereafter opened to release the non-sorbed hydrogen at a constant pressure $P_1$ into product outlet line 11 which conveys the compressed gas at the process pressure to the particular conversion process utilizing the enriched hydrogen gas. The pressure within line 11, cylinder 1, and sorbent bed 2, is maintained at a substantially constant level by movement of piston 3 from position B to position C as the compressed gas is bled from the cylinder through open valve $V_1$ in line 11.

When the piston reaches the position indicated in FIGURES 1 and 2 as C, substantially all of the hydrogen-enriched gas present in the sorbent bed has been discharged through valve 1 and line 11 at pressure $P_1$. At this stage of the process, all valves are closed, including valve $V_1$, and the constantly rotating fly-wheel moves the piston from position C to position A in FIGURE 1 and from position C to position A' in FIGURE 2, the pressure within the cylinder thereafter being at a level indicated as $P_2$, which is substantially lower than pressure $P_0$ and may be atmospheric or even subatmospheric, depending upon the ease of desorbing the sorbed component from the sorbent in bed 2. As the pressure within the cylinder is reduced from $P_1$ to $P_2$, the pressure is simultaneously reduced in sorbent bed 2 at the same rate as the pressure reduction in cylinder 1 and the previously sorbed component becomes desorbed at the substantially lower pressure $P_2$. Again, the piston is at position A in FIGURE 1 (position A' in FIGURE 2), and the system is at the lowest pressure provided during the cycle. As a result of the decompression of the gas phase in the sorbent bed within the cylinder, the sorbed component undergoes rapid desorption, filling the cylinder with desorbed raffinate component. Thereafter, valve $V_2$ in line 12 is opened as the fly-wheel carries piston 3 forward to its position B in FIGURE 1 corresponding to position C' in FIGURE 2, while simultaneously valves $V_0$ and $V_1$ are maintained in closed positions, thereby discharging the desorbed, raffinate component from the cylinder at pressure $P_2$ and delivering the selectively sorbed component into line 12 as a by-product of the process. After the complete discharge of the selectively sorbable component from the cylinder and the sorbent bed at pressure $P_2$, gaseous feed stock inlet valve $V_0$ is opened and valves $V_2$ and $V_1$ are closed, thereby delivering a new charge of hydrogen-containing feed gas mixture into the cylinder which completely fills the cylinder with feed gas as the pressure in the cylinder is raised from $P_2$ to $P_0$, the piston meanwhile changing position little, if any, as the connecting rod pin 8 passes through dead center. As more feed gas enters the cylinder, piston 3 moves from C' to A and the cylinder is again recharged with feed gas to repeat the cycle of operation.

The energy released in expansion of the gases present within the cylinder from the high pressure $P_1$ to the low pressure level $P_2$ is desirably recovered in order to take advantage of the potential energy available in the system at the high pressure of the gas phase in the system and thereby effect substantial economies in the operation of the process. Thus, the present process may be operated on the basis of two units of the above system operating in conjunction and in unison with each other, with the drive-shaft of one pump connected to the drive-shaft of the other pump, but having the respective cycles of operation displaced to the extent that during expansion of the gas from the high pressure at full compression to an intermediate pressure between the highest and lowest pressure levels, the energy released through such expansion of the gas is transmitted through the drive-shaft to the companion pump which raises the pressure of the feed gas to an intermediate pressure level between $P_0$ and $P_1$. The transfer of energy between the two companion pumps, operating in unison, but out of phase with each other thereby reduces the expenditure of total energy required to operate the system. Referring to the accompanying diagram, during the expansion of the compressed gas in the cylinder from pressure $P_1$ to pressure $P_2$ wherein the piston changes its position from C to A', the work delivered in such expansion in one system of apparatus may be transmitted through the fly-wheel to compress the gas mixture in the companion cylinder from pressure $P_2$ to pressure $P_0$ (accompanying a change in position of the piston from C' to A) or from pressure $P_0$ to pressure $P_1$ (in the change of position of the piston from position A to position B). The hydrogen concentrate is preferably discharged from the process at a pressure equal to the pressure in the process utilizing the hydrogen concentrate as a reactant. Since most hydrogenation processes consuming hydrogen are generally operated at high pressure levels, the present system of separation provides a means of reconcentrating the recycle hydrogen stream to a reuseable concentration, thereby operating in coordination with a high pressure hydrogen-consuming process at the convenient process pressure.

The present invention is further described in the following example which is provided herein to illustrate several of the specific embodiments involved in the present process, but with no intention of limiting the scope of the invention necessarily in accordance therewith.

In the catalytic reforming process referred to by its trade name, "Platforming," a gas oil charge stock is subjected to a combination of catalytic hydrocracking-dehydrogenation-aromatization reactions in the presence of hydrogen at a pressure of 700 pounds per square inch and at a temperature of 950° F., utilizing a catalyst consisting of 0.375 percent by weight of platinum, 0.35 percent by weight of chlorine and 0.35 percent by weight of fluorine on an alumina base in which the chlorine and fluorine are in combined form with the platinum and/or alumina. The hydrogen is supplied to the reaction zone in admixture with the charge stock, and is made up of a recycle hydrogen stream with sufficient pure hydrogen blended into the recycle to form a mixture containing 88 mole percent hydrogen.

The products of the reforming process are stabilized at the process pressure, producing a non-condensable overhead comprising a mixture of hydrogen and methane which can be separated by fractional distillation only at extremely high pressures and at high cost. At least a portion of the hydrogen present in the overhead, however, must be recovered for recycle to the process in order to be economically feasible. As the concentration of hydrogen in the stabilizer overhead is gradually reduced by continuous recycle of the effluent gas stream to the platforming process to less than 80 mole percent hydrogen, the conversion of gas oil feed stock to the desired gasoline end product in the reforming process is gradually reduced, until at 80 mole percent, the conversion is not at a sufficient rate to justify the process on the basis of continued recycle of the overhead.

In order to maintain the process on a continuous basis and simultaneously maintain the conversion at an economical rate, the non-condensable overhead of the product fractionator is mixed with a hydrogen concentrate, recovered as hereinafter indicated, and the resulting hydrogen-enriched gas charged into the reforming reaction zone as an 88 percent hydrogen stream. The remaining portion of the non-condensable product overhead (about 23 percent of the total non-condensable overhead), consisting of a mixture of 82 percent hydrogen, 16 percent methane, and small amounts of nitrogen, carbon dioxide, hydrogen sulfide, carbon monoxide, ethane and ethylene is pumped into a storage vessel where the gas is held at about 1000 p.s.i.g., pressure to provide a constant pressure supply of gaseous feed stock to a hydrogen concentration unit, operated in conjunction with the reforming unit, described hereinbelow.

The gas mixture separated as non-condensable overhead of the product receiver and comprising predominantly hydrogen, and methane is fed into a hydrogen concentration unit comprising a pair of sorption towers containing Linde Products Company 5A molecular sieves (dehydrated calcium alumino-silicate pellets containing pores of about 5 Angstrom units in cross-sectional diameter), the gas being charged into the first sorption tower at a pressure of 1000 pounds per square inch and at a temperature of 500° F. until the pressure is constant and sorption is complete. The feed gas mixture is thereafter switched to a second sorption tower also containing pellets of 5A molecular sieves sorbent, while at the same time the non-sorbed material in the first sorption tower is released from the sorbent, being withdrawn from the end of the bed opposite to the feed inlet. As the hydrogen concentrate is withdrawn from the sorbent bed, feed gas mixture at 1000 p.s.i.g. is simultaneously charged into the feed inlet end of the sorbent tower, thereby maintaining the pressure at the same constant level within the bed of sorbent while withdrawing the non-sorbed raffinate from the downstream end of the sorbent bed. The hydrogen concentrate thus withdrawn at a pressure of 1000 pounds per square inch gauge and at a temperature of 500° F. is a hydrogen concentrate containing 96.8 mole percent hydrogen, 2.5 percent methane and small amounts of nitrogen, carbon monoxide, etc. The hydrogen concentrate thus recovered is mixed with 60 percent by volume of feed gas mixture recovered from the reforming operation as non-condensable product receiver overhead, and recycled as 88 percent hydrogen recycle stream to the reforming process. After removal of the hydrogen concentrate from the exhaust end of the first sorbent tower, the sorbent bed of the first tower undergoes desorption by releasing the sorbed gases (primarily methane) through an expansion turbine having a discharge pressure of about 10 p.s.i.g., the work recovered thereby driving the first stage compressor which pumps the hydrogen-containing feed gas to a pressure of about 1000 p.s.i.g. Eighteen percent of the energy required to operate the two-compressor system is thus recovered by expansion of the gas, during desorption of the methane component from the sorbent, from a pressure of 1000 p.s.i.g. to 10 p.s.i.g.

The feed gas (stabilizer overhead) is alternately charged into sorbent beds 1 and 2 during the compression and desorption (decompression) stages to which the two beds are alternately subjected, the energy recovered from the decompression of the gas in one sorbent bed being utilized to operate the first stage of the compressor for compression of the gas in the other sorption stage While sorption takes place in one sorbent bed, desorption takes place in the other sorbent bed, thereby providing a constant flow of hydrogen concentrate product and desorbed methane product as the process is operated.

In succeeding runs, the Linde 5A molecular sieve sorbent in the two sorption towers is replaced by Linde Products Company 4A molecular sieves (dehydrated sodium alumino-silicate containing pores having a cross-sectional diameters of about 4 Angstrom units) and Norite (trade name for Norton Company activated carbon) in particle sizes ranging from 1/16 inch to 1/8 inch diameter as sorbents in the two sorption beds. A hydrogen concentrate product of substantially the same quality or hydrogen concentration is obtained in the use of the Linde Products Company 4A molecular sieves, whereas the product recovered in the use of the Norite activated carbon adsorbent is of slightly lesser hydrogen concentration (92 mole percent hydrogen), although the rate of desorption of the sorbed methane component during the decompression stage of the process is somewhat more rapid for activated carbon than for either 4A or 5A molecular sieves.

In still another run, activated alumina prepared by precipitating alumina hydrogel from an aqueous solution of aluminum chloride with ammonium hydroxide, drying the resulting hydrogel precipitate and activating the alumina at 600° C., when utilized as adsorbent in both adsorbent beds, produced a hydrogen-rich concentrate containing approximately 87 percent hydrogen, although the capacity of the adsorbent for use in the system is substantially less than either the molecular sieves or activated carbon sorbents. Thus, for a given quantity of hydrogen concentrate production, a much larger adsorbent bed is required for activated alumina than for either activated carbon or 5A or 4A molecular sieve sorbents. The rate of desorption, however, of the methane from the adsorbent is more rapid in the case of activated alumina than either activated carbon or the molecular sieve sorbents.

I claim as my invention:

1. A process for separating hydrogen from a mixture of gases comprising hydrogen and a normally non-condensable gas which is sorbed on a solid sorbent with greater retentivity at an elevated pressure than at atmospheric pressure which comprises introducing said mixture into a sorption zone having a portion thereof occupied by a bed of solid sorbent selected from the group consisting of activated carbon, activated alumina and a metal alumino-silicate molecular sieve sorbent, said sorption zone containing in another portion thereof a reciprocating piston connected to a fly-wheel exteriorly of said zone, moving said piston in the direction of the sorbent bed and thereby mechanically compressing said gas mixture in the first-mentioned portion of said zone sufficiently to sorb at least a portion of said non-condensable gas in the solid sorbent, withdrawing non-sorbed hydrogen from said zone at substantially the increased pressure, thereafter moving the piston away from the sorbent bed and thereby reducing the pressure in said zone and on the sorbent bed sufficiently to release sorbed component from the sorbent, and then withdrawing the released sorbed component from said zone under the reduced pressure.

2. The process of claim 1 further characterized in that said mixture of gases comprises methane.

3. The process of claim 1 further characterized in that said mixture of gases comprises a component selected from the group consisting of carbon monoxide and carbon dioxide.

References Cited in the file of this patent

UNITED STATES PATENTS

| | | |
|---|---|---|
| 1,426,462 | Claude | Aug. 22, 1922 |
| 1,934,075 | Lewis | Nov. 7, 1933 |
| 2,254,799 | Erdmann | Sept. 2, 1941 |
| 2,575,519 | Imhoff et al. | Nov. 20, 1951 |
| 2,859,256 | Hess et al. | Nov. 4, 1958 |
| 2,882,243 | Milton | Apr. 14, 1959 |
| 2,944,627 | Skarstrom | July 12, 1960 |
| 2,955,673 | Kennedy et al. | Oct. 11, 1960 |

FOREIGN PATENTS

| | | |
|---|---|---|
| 255,655 | Great Britain | July 29, 1926 |